Aug. 10, 1926.

C. H. HOWELL 1,595,097

DISPENSING APPARATUS FOR CHEESE AND THE LIKE

Filed Oct. 10, 1924

Inventor
Charles H. Howell
By
Attorney

Patented Aug. 10, 1926.

1,595,097

UNITED STATES PATENT OFFICE.

CHARLES H. HOWELL, OF MONTREAL WEST, QUEBEC, CANADA.

DISPENSING APPARATUS FOR CHEESE AND THE LIKE.

Application filed October 10, 1924. Serial No. 742,951.

This invention relates to improvements in dispensing apparatus for products, such as cheese, which are supplied to retailers in bricks or blocks designed to be severed into smaller portions as required by consumers.

A primary object of the invention is to provide a container for such products in which the products may be kept under sanitary conditions and without appreciable deterioration, and from which any required amount may be removed in a minimum of time and with great ease.

A further object is to provide dispensing apparatus of the character described having means for easily, quickly and accurately separating portions of the contents for sale.

A still further object is to provide a simple, inexpensive, durable and efficient apparatus of the character described which may remain in an operative location in a store and ready for immediate use.

At the present time food products such as cheese and butter, and notably that class of cheese known in the trade as "Kraft" cheese, are prepared by the manufacturers or packers in large bricks or blocks which are designed to be severed into portions of desired size for sale. In the case of Kraft cheese, the wrapper of the block is marked at intervals to indicate portions of one-half pound weight each in order to expedite handling the same during sale. Large blocks of butter are also marked in portions of pounds or fractions thereof. Ordinarily these large portions of food must be kept in refrigerators or other containers in order to avoid contamination, with the result that much time is consumed in moving the products back and forth and the product is subjected to considerable handling. If the products are not thus kept in proper containers they suffer deterioration and are liable to contamination.

According to the present invention, a container is provided preferably of a size and shape particularly adapted to the product to be sold, which container may remain on a store counter and preserve the contents from deterioration and contamination. The container is designed to be readily opened and closed in such a way as to expose only that portion of the contents which is to be removed. The container is preferably provided with means for severing the contents into portions of desired size. In this way a great saving of time may be effected and unnecessary handling of the contents eliminated.

In the further description of the invention the contents will be, for simplicity, referred to as cheese, but it will be understood that use of the invention is not confined to this particular product. The invention embodies essentially a container of suitable shape, size and material, opening at one end and containing a slide upon which the cheese rests, so that by withdrawing the slide any desired amount of cheese may be removed from the container. The slide is connected to an end closure for the container so that when the end closure is removed from the container the slide is automatically withdrawn. A cutting device, usually in the form of a thin wire, is connected at one end to the open end of the container adjacent the slide and is provided on the other end with a handle by means of which it may be forced through the cheese on the slide to sever the exposed portion of same, the end of the container serving as a guide for the wire to ensure proper cutting of the cheese.

In the accompanying drawings which illustrate one embodiment of the invention and a slight modification:—

Figure 1:
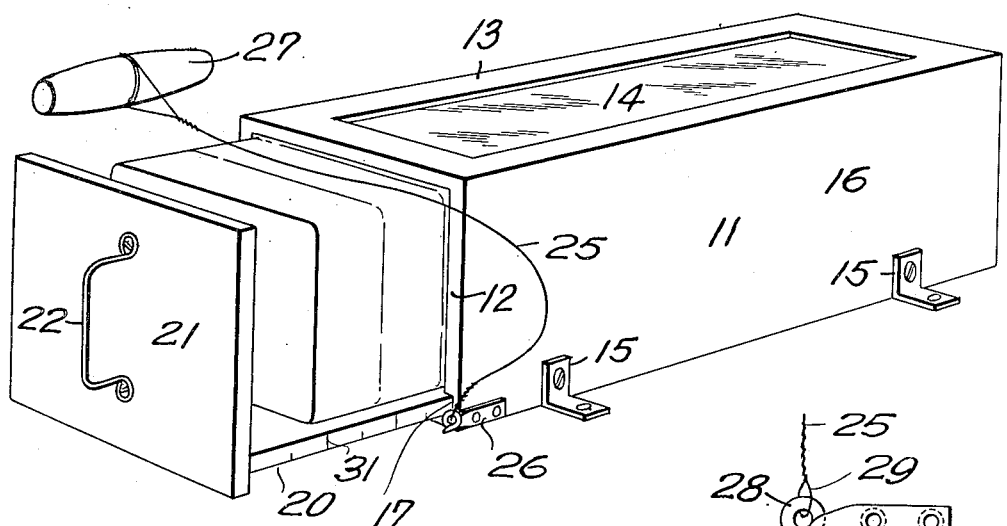
Fig. 1 is a perspective view of the device partly open and showing the method of operation.
Figure 3:
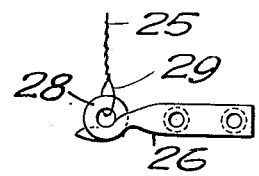
Fig. 3 is an elevation of the fastening means for the cutter.
Figure 2:
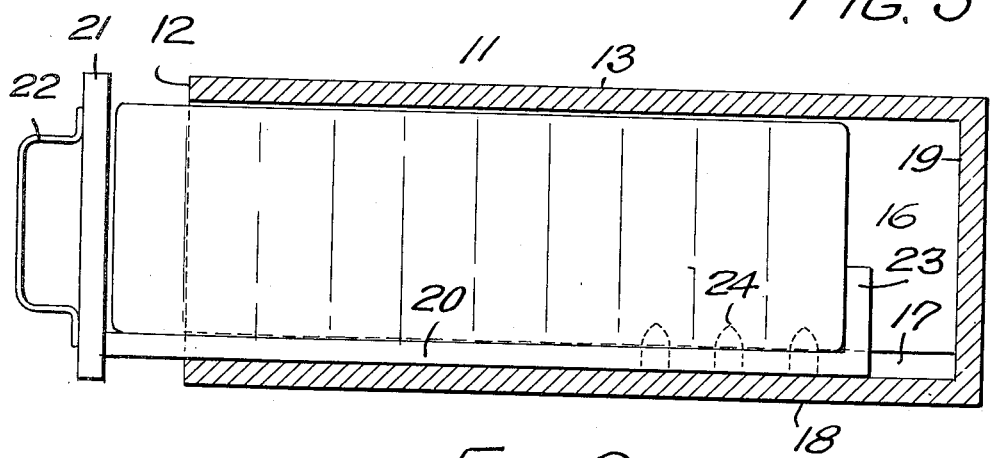
Fig. 2 is a longitudinal sectional view of the device.

Referring more particularly to the drawings, 11 designates a container of any suitable material, such as wood, having an open end 12. The top 13 of the container may, if desired, be provided with a transparent panel 14 through which the contents may be viewed. The container may be provided with lugs 15 or other means by which it may be attached to a store counter or other suitable support. The sides 16 of the container are internally grooved as at 17 at or close to the bottom 18, the grooves extending preferably from the open end 12 to the closed end 19. These grooves serve to guide a slide 20, the length of which is substantially the same or slightly less than the inside length of the container. It will be understood that if desired the grooves 17 may be omitted or that other forms of guiding means may be provided. An end closure 21 is provided for the container and is connected to an appropriate end of the slide. The end closure is preferably provided with a handle 22 to facilitate opening and closing the container and the movement of the slide. The inner end of the slide, that is to say, the end opposite the closure 21, may be provided with an upwardly projecting abutment 23 against which the cheese or other contents of the device may rest. The slide is further provided adjacent the abutment 23 with one or more upward projections 24 adapted to enter the cheese and hold the same against movement independently of the slide. These projections may take the form of sharp-pointed wooden pins set into the slide, or may take any other suitable form. Preferably these projections are spaced in the length of the slide with regard to the size of the portions into which the cheese is to be severed, to the end that the projections will not interfere with the cutting of the cheese. If the projections 24 or equivalent means are found sufficient to hold the cheese to the slide the abutment may be dispensed with, but ordinarily its existence is preferred as a means for gauging the position of the cheese when the same is being placed on the slide.

The cutting device consists preferably of a thin wire 25, one end of which is secured to the outside of the container close to the bottom by any suitable fastening means 26, and the opposite end of which is connected to a handle 27 of any suitable form; the wire being at least of a length to pass up one side and across the top of the container. The fastening 26 is preferably so disposed that the wire will swing just clear of or a little in contact with the open end of the container. Any suitable form of fastening for the wire may be used but the fastening now preferred consists of a wire or similar piece of metal bent toward one end to a single, slightly open helix 28 and adapted toward the opposite end for attachment to the container. The wire is preferably provided with a loop 29 which may be threaded onto the helix.

Figure 4:
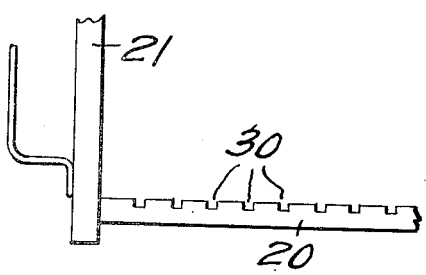
Fig. 4 is a fragmentary side elevation of the slide showing a modified construction.

While it will ordinarily suffice to use a slide having its upper or contact surface perfectly plain, it may be found advisable to transversely groove the upper surface, as indicated at 30, Figure 4, to facilitate the passage of the wire entirely through the cheese. Such grooves if used, will preferably be spaced in the length of the slide in definite relation to the size and specific gravity of the cheese so that slices thereof equal in thickness to the space between grooves will weigh predetermined amounts. The width of the grooves will preferably be appreciably greater than the diameter of the wire to avoid the necessity of very accurate adjustment of the slide in order to position the grooves for entrance of the wire.

The operation of the device is as follows:—The slide is withdrawn and a block of cheese or other material placed on the slide in abutting relation with the stop or gauge 23 and the cheese pressed down to rest firmly on the slide so that the projections 24 penetrate into the cheese. The slide is now inserted in the container and moved fully in by means of the end closure so as to completely enclose the cheese and protect the same from contamination and from deterioration, such as by drying. When it is desired to sever a portion of the cheese, the end closure is drawn away from the container and brings with it the slide and cheese until the desired amount of cheese is exposed. The amount of withdrawal is gauged in the case of Kraft cheese or other product marked out into portions of predetermined weight by the marking on the product itself, but when these markings are not available the amount drawn out may be gauged by a scale inscribed on an edge of the slide, as shown in Figure 1, or elsewhere. The operator then grasps the handle of the cutter and draws the wire across the top of the cheese, keeping the wire in contact with the open end of the container. By drawing downwardly on the handle the wire will cut smoothly and easily through the cheese, as is well known, and if kept pressed against the edge of the container adjacent the handle the cut will be perfectly straight and at right angles to the sides of the cheese. The severed portion of the cheese can now be removed and the closure pushed into engagement with the end of the container to close the same and protect the cheese. The abutment 23 and projections 24 both serve to cause the cheese to move with the slide during its withdrawal, and during the return of the slide into the container the projections 24 hold the cheese against any relative movement such as might be due to inertia or contact with the top of the container. If the cutting wire should become broken it may be detached from the fastening 26 and a fresh cutter substituted in a moment of time. If the transparent top panel is provided in the container the contents will be visible while protected, and moreover, a merchant can ascertain at a glance the amount of cheese remaining in the container.

While the preferred form of the invention has been described, it will be understood that the invention is not limited to this particular form or embodiment, but that many modifications may be made and any such modifications which fall within the scope of the appended claims are included in the invention. It will also be understood that use of the invention is not in any way confined to the use with the products herein specifically named, but is applicable to any product which may be dispensed in the manner described.

Having thus described my invention, what I claim is:—

1. A holding and dispensing device for cheese and the like, comprising a container open at one end, longitudinally disposed guides on the sides of the container adjacent the bottom adapted to retain a slide, a slide operatively engaging between and retained by said guides, an end closure for the container rigidly connected to one end of the slide, an abutment projecting upwardly from the opposite end of the slide, pins projecting upwardly from the slide at intervals in the length thereof, a cutting device releasably connected to the container at a lower corner of the open end thereof, said cutting device comprising a filamentary member connected at one end to the container and a handle connected to the opposite end of the filamentary member.

2. A holding and dispensing device for cheese and the like, comprising a container open at one end, longitudinally disposed guides on the sides of the container adjacent the bottom adapted to retain a slide, a slide operatively engaging between and retained by said guides, an end closure for the container rigidly connected to one end of the slide, an abutment projecting upwardly from the opposite end of the slide, said slide having transverse grooves disposed at regular intervals in its upper surface, a cutting device connected to the container at the open end thereof comprising an attachment member secured to the lower corner of the container at the open end thereof, and projecting beyond the end of the container, the projecting portion being helically formed to provide a loop or eye, a filamentary cutting member formed at each end into a loop, one loop of which is threaded upon the helical portion of the attachment member and passes through the eye thereof, and a handle passing through the loop at the opposite end of the filamentary member, said filamentary member being adapted when tensioned to enter an appropriately positioned groove of the slide thereby to pass below the surface of the slide and entirely through cheese or the like supported thereon.

In witness whereof, I have hereunto set my hand.

CHARLES H. HOWELL.